United States Patent
Shrestha et al.

(10) Patent No.: US 10,348,168 B2
(45) Date of Patent: Jul. 9, 2019

(54) INVERTER CELL ARRANGEMENT FOR BRUSHLESS ELECTRICAL MACHINE

(71) Applicant: ABB Technology AG, Zurich (CH)

(72) Inventors: Ghanshyam Shrestha, Apex, NC (US); Zhiguo Pan, Cary, NC (US); Mario Schweizer, Zurich (CH); Nikoloas Oikonomou, Daettwil (CH); Rajib Mikail, Raleigh, NC (US)

(73) Assignee: ABB Schweiz AG, Baden (CH)

( * ) Notice: Subject to any disclaimer, the term of this patent is extended or adjusted under 35 U.S.C. 154(b) by 224 days.

(21) Appl. No.: 15/170,426

(22) Filed: Jun. 1, 2016

(65) Prior Publication Data

US 2017/0353083 A1    Dec. 7, 2017

(51) Int. Cl.
| | |
|---|---|
| *H02K 11/00* | (2016.01) |
| *H02K 3/12* | (2006.01) |
| *H02K 11/33* | (2016.01) |
| *H02K 11/215* | (2016.01) |
| *H02K 3/28* | (2006.01) |
| *H02P 25/22* | (2006.01) |
| *H02P 27/06* | (2006.01) |
| *H02K 29/06* | (2006.01) |

(52) U.S. Cl.
CPC ............... *H02K 11/33* (2016.01); *H02K 3/12* (2013.01); *H02K 3/28* (2013.01); *H02K 11/215* (2016.01); *H02P 25/22* (2013.01); *H02P 27/06* (2013.01); *H02K 29/06* (2013.01); *H02K 2213/12* (2013.01)

(58) Field of Classification Search
CPC ................................................ H02K 11/00–40

USPC ............. 310/68 A–68 R; 318/400.01–400.42
See application file for complete search history.

(56) References Cited

U.S. PATENT DOCUMENTS

| | | | |
|---|---|---|---|
| 3,792,286 A * | 2/1974 | Meier ..................... | H02M 7/49 307/32 |
| 5,705,909 A | 1/1998 | Rajashekara | |
| 6,359,401 B1 | 3/2002 | Garcia-Sinclair et al. | |
| 6,759,870 B2 | 7/2004 | Liu | |
| 6,867,525 B2 | 3/2005 | Ionel et al. | |

(Continued)

FOREIGN PATENT DOCUMENTS

EP       0769220 B1    6/2004

OTHER PUBLICATIONS

Patent Cooperation Treaty International Search Report and Written Opinion dated Jan. 12, 2018 in counterpart PCT Application No. PCT/US17/35468 (7 pages).

*Primary Examiner* — Thomas Truong
(74) *Attorney, Agent, or Firm* — J. Bruce Schelkopf; Taft Stettinius & Hollister LLP (57) ABSTRACT

An electrical machine includes a stator core and a plurality of windings subdivided into a plurality of multiphase motor cells, each multiphase motor cell having M windings associated therewith, and having a phase shift relative to other multiphase motor cells. The electrical machine may include N inverter cells coupled in series; wherein each inverter cell is a multiphase inverter; and wherein the voltage magnitude supplied to a corresponding multiphase motor cell is $V_{DC}/N$. The electrical machine may include a sensor system in communication with the plurality of inverter cells and operative to commutate each inverter cell in a sequence.

18 Claims, 4 Drawing Sheets

(56) References Cited

U.S. PATENT DOCUMENTS

| | | |
|---|---|---|
| 7,183,734 B2 | 2/2007 | Lassen |
| 7,332,837 B2 | 2/2008 | Ward et al. |
| 7,701,154 B2 | 4/2010 | Oesterreicher et al. |
| 7,741,750 B1 | 6/2010 | Tang |
| 8,749,192 B2 | 6/2014 | Li et al. |
| 9,071,181 B2 | 6/2015 | Yersin |
| 2007/0120520 A1 | 5/2007 | Miyazaki et al. |
| 2009/0236930 A1* | 9/2009 | Nashiki ................ H02K 1/145 310/257 |
| 2009/0251024 A1* | 10/2009 | Huppunen ............... H02K 3/28 310/195 |
| 2011/0057591 A1* | 3/2011 | Tagome ................ B60L 11/123 318/400.23 |
| 2012/0206073 A1 | 8/2012 | Burke |
| 2015/0171674 A1 | 6/2015 | Lee et al. |
| 2015/0236634 A1* | 8/2015 | Han ................... H02K 11/0073 318/504 |

* cited by examiner

INVERTER CELL ARRANGEMENT FOR BRUSHLESS ELECTRICAL MACHINE

TECHNICAL FIELD

The present application generally relates to electrical machines, and more particularly, but not exclusively, to brushless electrical machines.

BACKGROUND

Electrical machines such as motors and generators are in wide use. Some existing systems have various shortcomings relative to certain applications. For example, electrical machines in certain size ranges generate undesirable amounts of torque ripple. Accordingly, there remains a need for further contributions in this area of technology.

SUMMARY

One embodiment of the present invention is a unique brushless electrical machine powered by a DC voltage, $V_{DC}$. The electrical machine has a stator core and a plurality of windings subdivided into a plurality of multiphase motor cells, each multiphase motor cell having M windings associated therewith, and having a phase shift relative to other multiphase motor cells. The electrical machine may include N inverter cells coupled in series; wherein each inverter cell is a multiphase inverter; and wherein the voltage magnitude supplied to a corresponding multiphase motor cell is $V_{DC}/N$. The electrical machine may include a sensor system in communication with the plurality of inverter cells and operative to commutate each inverter cell in a sequence. Further embodiments, forms, features, aspects, benefits, and advantages of the present application shall become apparent from the description and figures provided herewith.

DETAILED DESCRIPTION OF THE ILLUSTRATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Figure 1:
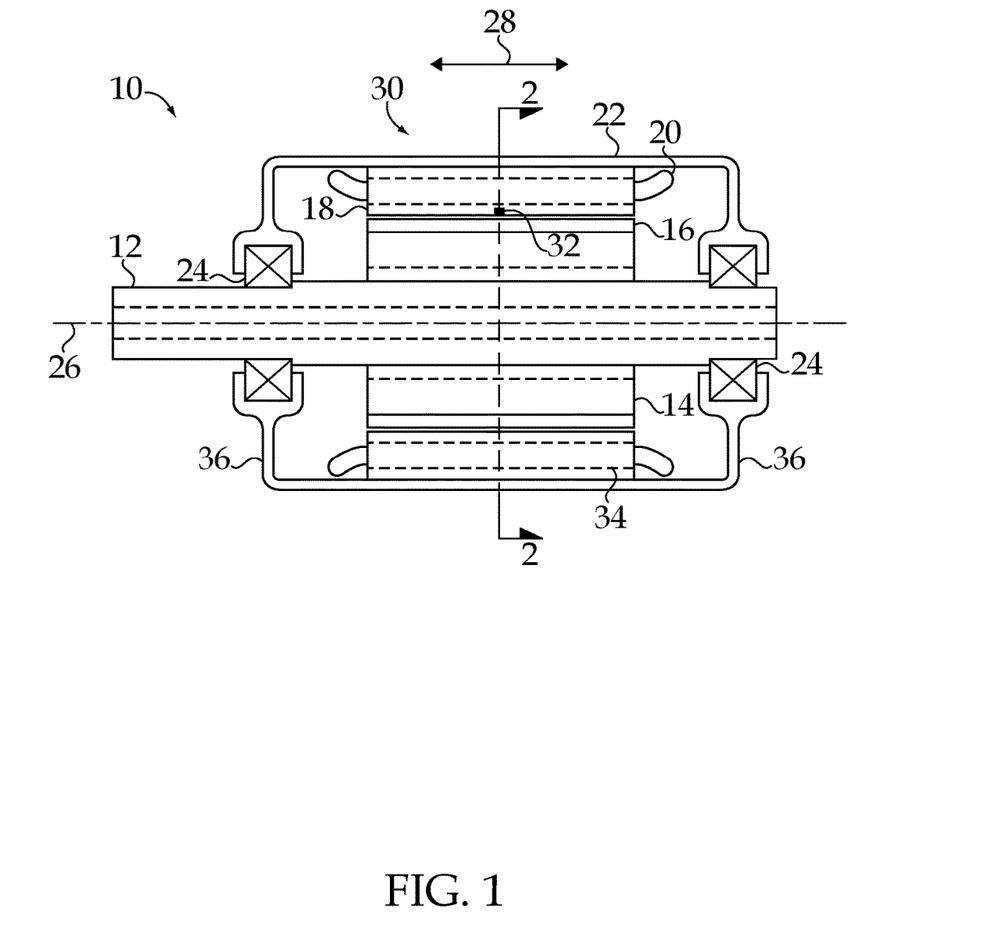
FIG. 1 schematically depicts some aspects of an electrical machine in accordance with a non-limiting example of an embodiment of the present invention.

Referring to the drawings, and in particular FIG. 1, some aspects of a non-limiting example of an electrical machine 10 in accordance with an embodiment of the present invention are schematically depicted. In one form, electrical machine 10 is a variable speed permanent magnet motor. In other embodiments, electrical machine 10 may be a motor and/or a generator, and may be any type of electrical machine, such as a switched reluctance motor or an induction motor or any other type of motor, generator or motor/generator. In various embodiments, electrical machine 10 may be a radial flux machine, an axial flux machine or a machine having a three-dimensional (3D) flux path. Electrical machine 10 includes a shaft 12, a rotor 14 having permanent magnets (poles) 16, a stator 18 having stator windings 20, a housing 22 and bearings 24. Shaft 12 and rotor 14 rotate about an axis of rotation 26, which defines an axial direction 28.

Shaft 12 is constructed to support rotor 14 and react radial and axial or thrust loads from rotor 14. In one form, shaft 12 is operative to transmit mechanical power from electrical machine 10 as an output of electrical machine 10. In other embodiments, shaft 12 may be operative to transmit mechanical power to and/or from electrical machine 10. Shaft 12 is axially and radially positioned by bearings 24. Shaft 12 and bearings 24 define axis of rotation 26 and corresponding axial direction 28.

Rotor 14 and stator 18 are in magnetic communication with each other. Each of rotor 14/poles 16 and stator 18 have a construction that is operative to direct magnetic flux toward and from each other. In some embodiments, rotor 14 may include other operative sources of magnetic flux, e.g., bus bars, windings or both, in conjunction with or in place of permanent magnets 16. In one form, permanent magnets 16 are surface mount ferrite magnets. In other embodiments, other configurations and/or compositions may be employed, e.g., including embedded configurations and/or rare earth magnet compositions. Electrical machine 10 does not employ mechanical commutation. Rather, electrical machine 10 is a brushless machine, employing electronic commutation. Windings 20 are electronically switched or commutated based on the output of a commutation sensor system 30, which detects rotor 14 position. In one form, sensor system 30 is a plurality of Hall effect sensors 32. Hall effect sensors form a relatively low cost rotor position detection system. In other embodiments, other electric or electronic commutation sensor systems may be employed, e.g., encoders such as wheel encoders, or other sensor systems.

Stator windings 20 are disposed within passages 34 in stator 18. In one form, stator windings 20 are copper conductors. In other embodiments, aluminum and/or other conductor materials may be employed in addition to or in place of copper. Windings 20 are constructed for magnetic communication with poles 16. In one form, passages 34 are linear, and extend through the length of stator 18 in axial direction 28. In other embodiments, passages 34 may be skewed, may be radial passages or may be passages having a centerline that extends in any two or more of axial, radial and circumferential directions through all or part of stator 18. In some embodiments, stator 18 may include other passages in addition to passages 34, e.g., cooling passages or other passages. In some embodiments, passages 34 may be also constructed to allow a flow of a cooling medium therethrough.

In one form, bearings 24 are mounted in and supported by end plates 36 of housing 22. In other embodiments, bearings 24 may be mounted and coupled to housing 22 via one or more other structures and/or integral features of housing 22. Bearings 24 are constructed to react shaft 12 and rotor 14 axial or thrust loads in direction 28, and to react shaft 12 and rotor 14 radial loads perpendicular to axis of rotation 26. Housing 22 is constructed to enclose stator 18 and react loads associated with stator 18, e.g., loads generated due to magnetic interaction between stator 18 and rotor 14.

During the commutation period when one winding is switched on and another is switched off, instantaneous currents and voltage are generated, which are a function of the rise and decay of current due to the coil inductance, which changes with time unequally, thus creating torque ripple. An electrical machine with a higher number of phases will have smaller coil inductances, which are shifted spatially in the machine, yielding a .torque ripple having a lower amplitude with a higher frequency. For example, a high pole number permanent magnet machine with fractional slot concentrated windings may be configured as a multi-phase brushless DC (BLDC) motor with trapezoidal back emf, with a discrete number of multiphase motor cells, each motor cell being formed of a plurality of windings, at least some of which are phased, e.g., 3-phase motor cells, and phase shift between the multiphase cells. A multiphase (series or parallel) inverter or converter may be configured as multiple discrete BLDC inverters. Each of the motor and inverter cells may be operated independently with a square wave operation based on feedback from one or more sensors, such as Hall effect sensors independently placed for each cell operation. The number of Hall effect sensors may be reduced, e.g., for any motor cells that have no phase shift or have the opposite phase shift.

Figure 2:
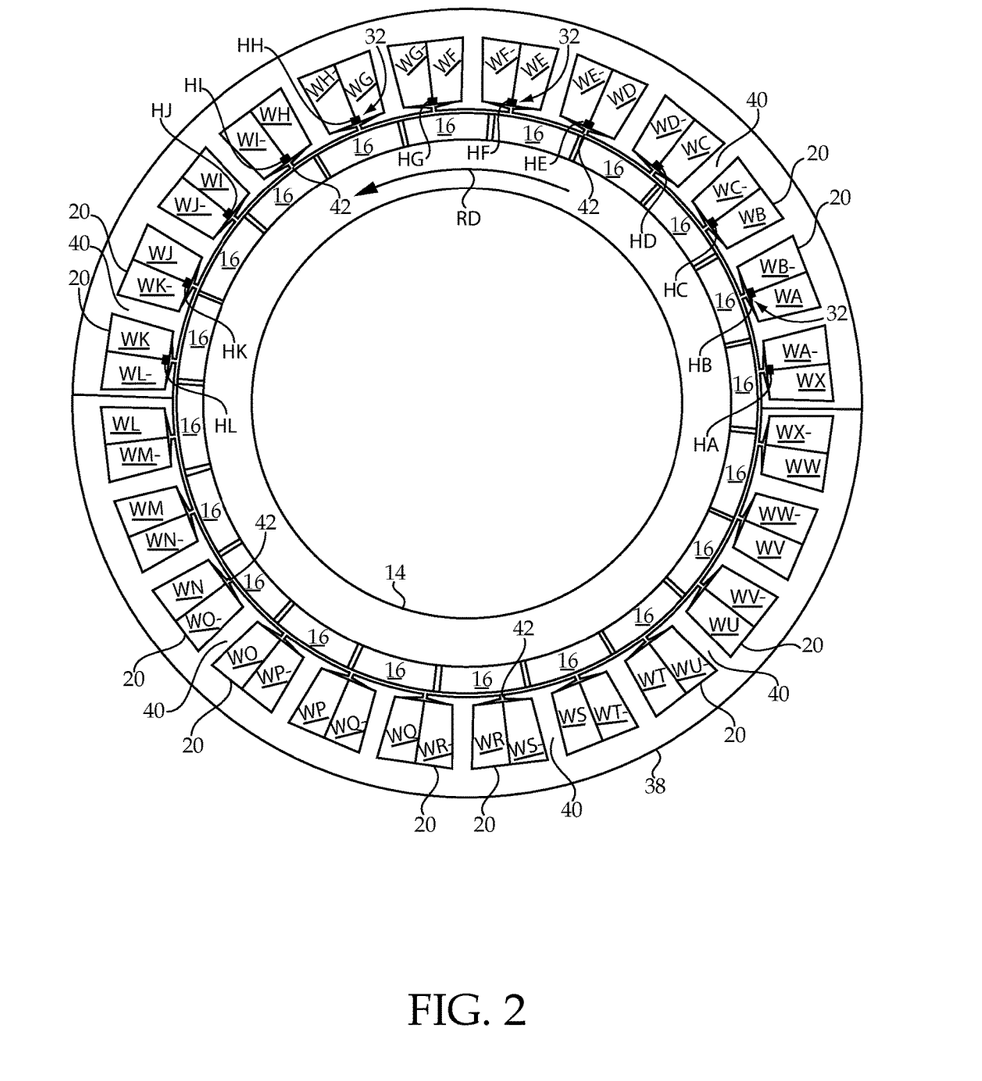
FIG. 2 schematically depicts some aspects of a stator for an electrical machine in accordance with a non-limiting example of an embodiment of the present invention.

Referring to FIG. 2, some aspects of a non-limiting example of stator 18 in accordance with an embodiment of the present invention are schematically illustrated. Stator 18 includes a stator core 38, e.g., a laminated core, which has a plurality of teeth 40 and a plurality of slots 42. Each slot 42 is disposed between a corresponding adjacent pair of stator teeth 40. Windings 20 are disposed about teeth 40. In one form, windings 20 are fractional slot concentrated windings. In other embodiments, windings 20 may take other forms, and may be, for example, distributed windings in addition to or in place of concentrated windings. In the non-limiting example of FIG. 2, a quantity of 24 windings 20 are employed, and a quantity of 20 permanent magnets or poles 16 are employed. In other embodiments, the quantity of windings and the quantity of poles may vary with the needs of the application. Windings 20 and are associated with reference characters WA-WX, and identified in FIG. 2 with reference character pairs WA-, WA; WB-, WB; WC-, WC; ... WX-, WX, wherein the "W" designates a winding, the second alpha character indicates one of the 24 windings A-X, and the "-" character or lack thereof following the second alpha character pertains to the direction of current flow of the depicted portion of the winding, e.g., into or out of the plane of FIG. 2.

Windings 20 are subdivided into a plurality of groups of windings, each group forming a multiphase motor cell. Each multiphase motor cell has a number, M, of windings associated therewith. In the non-limiting example of the 24 windings are divided into eight (8) motor cells (MC) having M=3 windings each, as follows: motor cell MC1 is defined by windings WA, WE and WI; motor cell MC2 is defined by windings WM, WQ and WU; motor cell MC3 is defined by windings WB, WF and WJ; motor cell MC4 is defined by windings WN, WR and WV; motor cell MC5 is defined by windings WC, WG and WK; motor cell MC6 is defined by windings WO, WS and WW; motor cell MC7 is defined by windings WD, WH and WL; and motor cell MC8 is defined by windings WP, WT and WX. In other embodiments, the windings may be subdivided into any number of motor cells suitable to the application, and the number of windings and location of windings about stator 18 in each motor cell may vary with the needs of the application.

Figure 3:
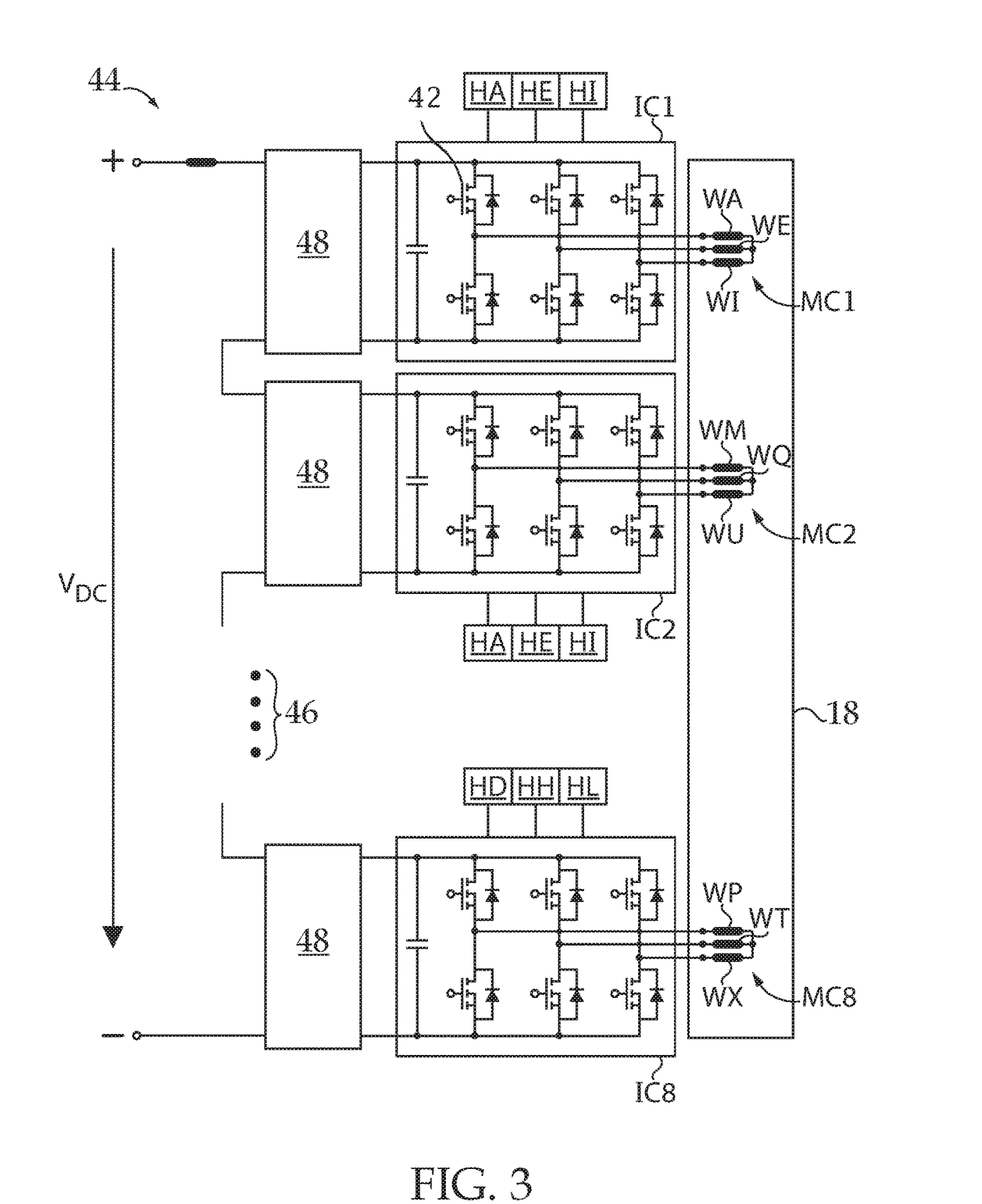
FIG. 3 schematically depicts some aspects of an inverter system for an electrical machine in accordance with a non-limiting example of an embodiment of the present invention.

Referring to FIG. 3, some aspects of a non-limiting example of an inverter system 44 in accordance with an embodiment of the present invention are schematically illustrated. Inverter system 44 includes a quantity of N discrete inverter cells arranged in series. The number, N, may vary with the needs of the application. In the present non-limiting example, electrical machine 10 employs N=8 discrete inverter cells, IC1-IC8, one for each motor cell. Each inverter cell is a multiphase inverter. In other embodiments, the number of inverter cells may vary with the needs of the application. For example, in some embodiments, two (2) or more inverter cells may power each motor cell; whereas in other embodiments, one (1) inverter cell may power two (2) or more motor cells.

Inverter system 44 is coupled to a power source that supplies a voltage $V_{DC}$. In one form, $V_{DC}$ is a DC voltage. In other embodiments, $V_{DC}$ may be a rectified AC voltage, e.g., effectively a DC voltage having an AC ripple component. In one form, each of the discrete inverter cells is a square wave inverter, e.g., a BLDC inverter. In other embodiments, the inverter cells may be configured to output one or more other waveforms, e.g., trapezoidal waves. In one form, the output of the discrete inverter cells is not pulse width modulated. Each inverter cell includes a plurality of switches devices, such as switching device 42 of inverter cell IC1. In one form, each inverter cell employs low power MOSFET's. In other embodiments, other power switching devices may be employed in addition to or in place of MOSFET's, e.g., IGBT's, GaN wide band gap devices, or other suitable switching devices. In one form, the discrete inverter cells are coupled in series, and hence, the voltage drop across each inverter cell is $V_{DC}/N$. In other embodiments, the inverter cells may be coupled in parallel or in a combination series/parallel relationship. For example, in some embodiments, groups of inverter cells, wherein the inverter cells within each group are arranged in parallel with each other, and wherein each group is arranged in series with the other groups. In such a case, N pertains to the number of groups that are arranged in series with each other.

In one form, each inverter cell is multiphase, e.g., 3-phase. In one form, the number of inverter phases defines the number of phases of the motor cells. In some embodiments, a single winding may be associated with each phase of the respective motor cell and/or inverter cell, whereas in other embodiments more than one winding may be associated with each phase of the respective motor cell and/or inverter cell. In other embodiments, the inverter cells may be single phase or may have any number of phases. FIG. 3 illustrates three (3) of the eight (8) inverter cells of electrical machine 10, IC1, IC2 and IC8, the balance being indicated by the vertical ellipsis 46.

Each discrete inverter cell is electrically coupled to a motor cell, and is operative to supply power, e.g., a power signal, to the windings of that motor cell at a voltage magnitude of $V_{DC}/N$. For example, inverter cell IC1 is coupled to windings WA, WE and WI of motor cell MC1, and is operative to supply 3-phase power to motor cell MC1 at a voltage magnitude of $V_{DC}/N$. Similarly, inverter cell IC2 is coupled to windings WM, WQ and WU of motor cell MC2, and is operative to supply 3-phase power to motor cell MC2 at a voltage magnitude of $V_{DC}/N$. Inverter cells IC3-IC7 are similarly coupled to the windings of respective motor cells MC3-MC7 and supply 3-phase power to respective motor cells MC3-MC7 at a voltage magnitude of $V_{DC}/N$. Inverter cell IC8 is coupled to windings WP, WT and WX of motor cell MC8, and is operative to supply 3-phase power to motor cell MC8 at a voltage magnitude of $V_{DC}/N$. In the illustrated embodiment, each inverter cell is coupled to a cell bypass circuit 48, which bypasses the cell in the event of an anomaly with that cell. Other embodiments may not employ cell bypass circuits.

Sensor system 30 is in communication with inverter cells IC1-IC8, and is operative to commutate or activate and deactivate each discrete inverter cell in a desired sequence to produce a rotation of rotor 14, e.g., in a direction RD illustrated in FIG. 2. In one form, Hall effect sensors 32 are mounted on stator 18. In other embodiments, Hall effect sensors 32 may be mounted on one or more other structures in addition to or in place of stator 18. Hall effect sensors 32 are spaced apart circumferentially from each other. The spacing between individual Hall effect sensors 32 may or may not be the same, depending upon the embodiment. Hall effect sensors 32 are constructed to sense the position of rotor 14, e.g., rotational location, and to provide on/off signaling for switching of corresponding inverters IC1-IC8. The number of Hall effect sensors varies with the needs of the particular application. For example, in some embodiments one Hall effect sensor per winding 20 may be employed. As another example, in applications where two or more windings or motor cells are turned on or off at the same time, the number of Hall effect sensors may be reduced accordingly. For instance, in the present non-limiting 12-phase electrical machine 10 configuration, there is a repetition of phases, e.g., wherein oppositely disposed windings (e.g., disposed opposite to each other on stator 18) are turned on and off at the same time. For example, MC1 and MC2 are powered by inverter cells IC1 and IC2 simultaneously, e.g., with wave forms that are simultaneous, as are the pairs MC3 and MC4; MC5 and MC6; and MC7 and MC8 by respective inverter cell pairs IC3 and IC4; IC5 and IC6; and IC7 and IC8. Accordingly, the same Hall effect sensors may be used to commutate or provide on/off signals to MC1 and MC2; the same Hall effect sensors may be used to provide on/off signals to MC3 and MC4; and likewise with the pairs MC5 and MC6; and MC7 and MC8.

Similarly, in embodiments where two windings or motor cells have opposite phases, i.e., are 180° out of phase, the same Hall effect sensors may be employed to send on/off signals for the inverters that power those windings or motor cells. Also, in embodiments using a parallel or series/parallel multiphase inverter or converter configurations, the same Hall effect sensors may be employed to send on/off signals to those windings or motor cells that have the same phase or opposite phase. In the non-limiting example of FIGS. 2 and 3, electrical machine 10 is a 12-phase machine because there are eight (8) motor cells, which are commutated two (2) at a time; and which are 3-phase motor cells. Hence, the number of phases of the electrical machine 10 of FIGS. 2 and 3 is (the number of phases per motor cell)×(the number of motor cells)/(the number of motor cells that are commutated simultaneously)=(3×8)/2=12. In other embodiments, electrical machine 10 may have any number of phases suitable to the application, wherein any number of motor cells may be commutated simultaneously or no motor cells may be commutated simultaneously, and where the number of motor cells and the number of phases of each motor cell may vary with the needs of the application.

In the non-limiting example of FIG. 2, a quantity of 12 Hall effect sensors 32 are employed, identified as sensors HA, HB, HC, ... HL. Hall effect sensors HA, HE and HI are coupled to inverters IC1 and IC2, and are used to send on/off signals to commutate or actuate motor cell MC1 and oppositely disposed (180° about stator 18) motor cell MC2 at the same time. Similarly, Hall effect sensors HB, HF and HJ are coupled to inverters IC3 and IC4 for sending on/off signals to actuate motor cell MC3 and oppositely disposed motor cell MC4. Likewise for Hall effect sensors HC, HG and HK for inverters IC5 and IC6 and motor cell MC5 and oppositely disposed motor cell MC6; and Hall effect sensors HD, HH and HL for inverters IC7 and IC8 and motor cell MC7 and oppositely disposed motor cell MC8. The motor cells within the pairs (MC1, MC2), (MC3, MC4), (MC5, MC6) and (MC7, MC8) are commutated at the same time, whereas each pair is phase shifted relative to the other pairs. In other embodiments, the phase shift arrangement as between the motor cells (as well as between the windings that form each cell) may vary with the needs of the application. In one form, inverters IC1-IC8 provide square wave power signals to windings 20, and hence, computing hardware is not required for variable speed machine 10 operation. Rather, variable speed operation is obtained by varying the supply voltage, $V_{DC}$.

Figure 4:
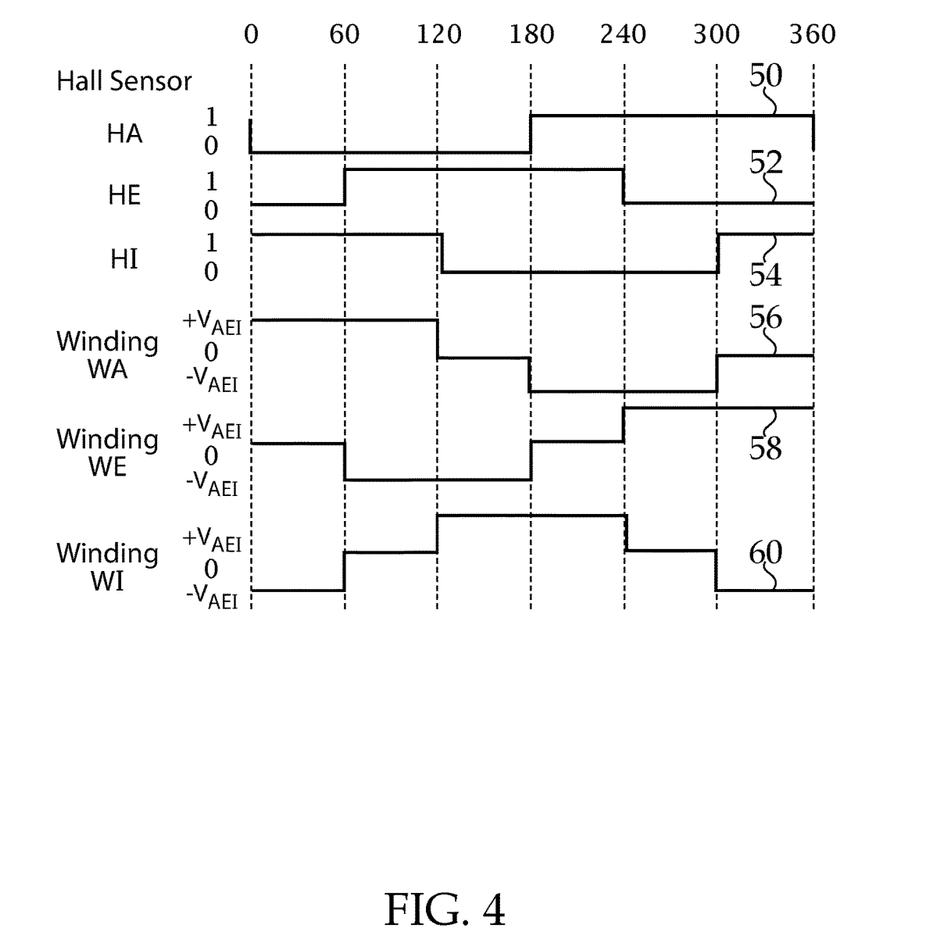
FIG. 4 schematically illustrates some aspects of a commutation sequence of a motor cell in accordance with a non-limiting example of an embodiment of the present invention.

Referring to FIG. 4, some aspects of a non-limiting example of a six-step commutation of motor cell MC1 in accordance with an embodiment of the present invention are illustrated. Other commutation sequences may be employed in other embodiments. In the present non-limiting example, each motor cell MC2-MC8 is commutated similarly to the sequence illustrated in FIG. 4. Regarding motor cell MC1, respective Hall effect sensors HA, HE and HI supply commutation signals 50, 52 and 54 as input signals for use by inverter cell IC1. Power signals 56, 58 and 60 represent the power signals supplied to respective windings WA, WE and WI of motor cell MC1 from inverter cell IC1 based on the respective Hall effect sensor HA, HE and HI commutation signals 50, 52 and 54, e.g., and in some embodiments, also based on the use of a lookup table. Voltage $V_{AEI}$ is the voltage supplied to motor cell MC1 by inverter cell IC1, and has a magnitude of $V_{DC}/N$. Thus, it is seen that the voltage supplied to the motor cells is in the form of square waves that step between $V_{AEI}$, zero voltage and $-V_{AEI}$, or $V_{DC}/N$, zero voltage and $-V_{DC}/N$.

Each motor cell and discrete inverter cell is thus operated independently with a simple square ware operation based on the feedback from Hall effect sensors 32, which are independently placed for each cell operation or the operation of groups of cells. The back emf tends toward being pseudo trapezoidal when typical stator teeth, permanent magnets and windings are employed in some embodiments. In one form, stator teeth 40 and/or windings 20 are constructed or modified to make the back emf trapezoidal or more trapezoidal, e.g., using computer aided design analytical software and techniques. In other embodiments permanent magnets 16 and/or rotor conductors may also or alternatively be constructed or modified to make the back emf trapezoidal or more trapezoidal, e.g., using computer aided design analytical software and techniques. In still other embodiments, stator teeth 40, windings 20 and/or permanent magnets 16 and/or any rotor conductors may be constructed to yield back emf waveforms of other desired shapes, e.g., sinusoidal. By subdividing electrical machine 10 into a plurality of multiphase motor cells, the torque ripple may be reduced in some embodiments. By arranging the inverters for the motor cells in series, the torque ripple may be further reduced in some embodiments, e.g., because the torque generated by each motor cell is reduced. The reduction in torque ripple is illustrated in Table 1, below, which compares the 12-phase electrical machine illustrated in FIGS. 1-4 with a 3-phase BLDC machine.

TABLE 1

Comparison Of 12-Phase and 3-Phase Electrical Machines

|  | Phase | |
| --- | --- | --- |
|  | 12-Phase | 3-phase |
| Terminal Current (rms) (A) | 10.8 | 10.8 |
| Shaft Power (kW) | 7.2 | 6.94 |
| Output Torque Range (Nm) | 44.9-46.4 | 40-46.6 |
| Torque Ripple (%) | 2.6 | 14.9 |

From TABLE 1, it is seen that for two electrical machines having equivalent terminal current, the 12-phase electrical machine of the non-limiting example of an embodiment illustrated and described herein has a slightly higher shaft power output, and a significantly tighter output torque range with a 2.6% torque ripple, whereas the 3-phase electrical machine exhibits a significantly higher 14.9% torque ripple. Because the inverter cells are arranged in series, the voltage across each inverter is lower, allowing the use of lower voltage and hence less costly low power MOSFET's. Because each inverter cell is phased, e.g., 3-phase, and the inverter cells are phased relative to each other, a machine having a high phase number may be created using relatively low cost multiphase, e.g., 3-phase, square wave BLDC inverters, reducing overall cost, while substantially reducing torque ripple because of the number of phases of the electrical machine. Square wave BLDC inverters provide a relatively low cost switching system, e.g., relative to pulse-width modulated (PWM) sinusoidal converters. PWM sinusoidal converters cannot be replaced by substitution with square wave BLDC inverters in existing electrical machines without substantially increasing torque ripple.

Embodiments of the present invention include a brushless electrical machine powered by a DC voltage, VDC, comprising: a stator core having a plurality of teeth; a plurality of windings, each winding disposed about at least one stator tooth, wherein the plurality of windings are subdivided into a plurality of multiphase motor cells, each multiphase motor cell having a number, M, of windings associated therewith; and each multiphase motor cell having a phase shift relative to other multiphase motor cells; a plurality of discrete square wave inverter cells, wherein a number, N, of the discrete square wave inverter cells are coupled in series; wherein each square wave inverter cell is electrically coupled to a multiphase motor cell; wherein each square wave inverter cell is a multiphase inverter; and wherein the voltage magnitude supplied from each square wave inverter cell to the corresponding multiphase motor cell is VDC/N; and a sensor system in communication with the plurality of square wave inverter cells and operative to commutate each square wave inverter cell in a sequence.

In a refinement, M=3 for each of the motor cells.

In another refinement, the windings are fractional slot windings.

In yet another refinement, the windings are fractional slot concentrated windings.

In still another refinement, the electrical machine has at least six (6) phases.

In yet still another refinement, the plurality of discrete square wave inverter cells supply power to pairs of the multiphase motor cells simultaneously.

In a further refinement, the poles are permanent magnet poles.

In a yet further refinement, each discrete square wave inverter cell is operative to supply power to more than one winding.

In a still further refinement, the electrical machine further comprises a rotor, wherein the sensor system includes a plurality of Hall effect sensors operative to sense a rotor position; and wherein each Hall effect sensor is operative to provide a switch signal to turn on or off a corresponding one of the discrete square wave inverter cells.

Embodiments of the present invention include a brushless electrical machine powered by a DC voltage, the DC voltage being VDC, comprising: a rotor having a plurality of poles; a stator having a plurality of windings constructed for magnetic communication with the poles; wherein the plurality of windings are subdivided into a plurality of multiphase motor cells, each multiphase motor cell being formed of a plurality of windings; and each multiphase motor cell being phase shifted relative to another multiphase motor cell; a voltage converter formed of a plurality of discrete brushless DC inverter cells, wherein at least a number, N, of the discrete brushless DC inverter cells are coupled to each other in a series arrangement, wherein each brushless DC inverter cell is operative to supply power to a multiphase motor cell; and wherein the voltage magnitude supplied to each multiphase motor cell is VDC/N; and a sensor system in communication with the plurality of brushless DC inverter cells, wherein the sensor system is operative to sense a position of the rotor and to commutate a corresponding brushless DC inverter cell based on the sensed rotor position.

In a refinement, each multiphase motor cell is a 3-phase motor cell.

In another refinement, the stator including a plurality of slots, each slot being disposed between adjacent windings, wherein the windings are fractional slot windings.

In yet another refinement, the windings are fractional slot concentrated windings.

In still another refinement, the electrical machine has at least six (6) phases.

In yet still another refinement, the voltage converter is constructed to supply power to pairs of the multiphase motor cells simultaneously.

In a further refinement, the poles are permanent magnet poles.

In a yet further refinement, each brushless DC inverter cell is operative to supply square wave power signals to the multiphase motor cell.

In a still further refinement, the sensor system includes a plurality of Hall effect sensors operative to determine rotor rotational location; and wherein each Hall effect sensor is in electrical communication with a corresponding one of the discrete brushless DC inverter cells.

Embodiments of the present invention include a brushless electrical machine, comprising: a rotor having a plurality of poles; means for providing torque to the rotor; and means for sensing a position of the rotor.

In a refinement, the means for providing torque includes a plurality of multiphase motor cells powered by a plurality of discrete square wave inverter cells coupled in series.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A brushless electrical machine powered by a DC voltage, $V_{DC}$, comprising:
    a stator core having a plurality of teeth;
    a plurality of windings, each winding disposed about at least one stator tooth, wherein the plurality of windings are subdivided into a plurality of multiphase motor cells, each multiphase motor cell having a number, M, of windings associated therewith; and each multiphase motor cell having a phase shift relative to other multiphase motor cells;
    a plurality of discrete square wave inverter cells, wherein a number, N, of the discrete square wave inverter cells are coupled in series; wherein each square wave inverter cell is electrically coupled to a multiphase motor cell; wherein each square wave inverter cell is a multiphase inverter; and wherein the voltage magnitude supplied from each square wave inverter cell to the corresponding multiphase motor cell is $V_{DC}/N$; and
    a sensor system comprising a sensor including an output coupled to a switching device of one of the discrete square wave inverter cells, the sensor being structured to sense a rotor position and turn on or off the switching device without an intervening controller.

2. The electrical machine of claim 1, M=3 for each of the motor cells.

3. The electrical machine of claim 1, wherein the windings are fractional slot windings.

4. The electrical machine of claim 3, wherein the windings are fractional slot concentrated windings.

5. The electrical machine of claim 1, wherein the electrical machine has at least six (6) phases.

6. The electrical machine of claim 1, wherein the plurality of discrete square wave inverter cells supply power to pairs of the multiphase motor cells simultaneously.

7. The electrical machine of claim 6, wherein the poles are permanent magnet poles.

8. The electrical machine of claim 1, wherein each discrete square wave inverter cell is operative to supply power to more than one winding.

9. The electrical machine of claim 1, further comprising a rotor, wherein the sensor system includes a plurality of Hall effect sensors operative to sense a rotor position; and
    wherein each Hall effect sensor is operative to provide a switch signal to turn on or off a corresponding one of the discrete square wave inverter cells.

10. A brushless electrical machine powered by a DC voltage, the DC voltage being $V_{DC}$, comprising:
    a rotor having a plurality of poles;
    a stator having a plurality of windings constructed for magnetic communication with the poles; wherein the plurality of windings are subdivided into a plurality of multiphase motor cells, each multiphase motor cell being formed of a plurality of windings; and each multiphase motor cell being phase shifted relative to another multiphase motor cell;
    a voltage converter formed of a plurality of discrete brushless DC inverter cells, wherein at least a number, N, of the discrete brushless DC inverter cells are coupled to each other in a series arrangement, wherein each brushless DC inverter cell is operative to supply power to a multiphase motor cell; and wherein the voltage magnitude supplied to each multiphase motor cell is $V_{DC}/N$; and
    a sensor system including a sensor coupled to a switching device of the plurality of brushless DC inverter cells, the sensor being structured to sense a rotor position, generate a control signal based on the sensed rotor position, and output the control signal directly from the sensor to the switching device.

11. The electrical machine of claim 10, wherein each multiphase motor cell is a 3-phase motor cell.

12. The electrical machine of claim 10, the stator including a plurality of slots, each slot being disposed between adjacent windings, wherein the windings are fractional slot windings.

13. The electrical machine of claim 12, wherein the windings are fractional slot concentrated windings.

14. The electrical machine of claim 10, wherein the electrical machine has at least six (6) phases.

15. The electrical machine of claim 10, wherein the voltage converter is constructed to supply power to pairs of the multiphase motor cells simultaneously.

16. The electrical machine of claim 10, wherein the poles are permanent magnet poles.

17. The electrical machine of claim 10, wherein each brushless DC inverter cell is operative to supply square wave power signals to the multiphase motor cell.

18. The electrical machine of claim 10, wherein the sensor system includes a plurality of Hall effect sensors operative to determine rotor rotational location; and wherein each Hall effect sensor is in electrical communication with a corresponding one of the discrete brushless DC inverter cells.

* * * * *